United States Patent Office 3,769,430
Patented Oct. 30, 1973

3,769,430
PHARMACEUTICAL COMPOSITIONS CONTAINING A BIS-(DIHYDROXY-PHENYL-ETHYLOL)-SUBSTITUTED ALKYLENEDIAMINE AND METHODS OF USING SAME
Kurt Schromm, Anton Mentrup, Karl Zeile, and Ernst-Otto Renth, Ingelheim am Rhein, Albrecht Engelhardt, Mainz, and Werner Traunecker, Munster-Sarmsheim, Germany, assignors to Boehringer Ingelheim G.m.b.H., Ingelheim am Rhein, Germany
No Drawing. Original application Dec. 2, 1969, Ser. No. 881,606, now Patent No. 3,673,187, dated June 27, 1972. Divided and this application May 12, 1972, Ser. No. 252,615
Int. Cl. A61k 27/00
U.S. Cl. 424—330
10 Claims

ABSTRACT OF THE DISCLOSURE

Pharmaceutical compositions comprising as an active ingredient a compound of the formula

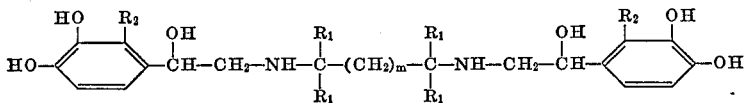

wherein $R_1$ is hydrogen or methyl,
$R_2$ is methyl, methoxy, ethoxy or chlorine and, if $R_1$ is methyl, additionally hydrogen, and
$m$ is a whole number from 0 to 10, inclusive, or a non-toxic, pharmacologically acceptable acid addition salt thereof; and methods of using the same as uterine spasmolytics, antipruritics, vasodilators and antiallergics.

---

This is a division of copending application Ser. No. 881,606, filed Dec. 2, 1969, now U.S. Patent No. 3,673,-187, issued June 27, 1972.

This invention relates to novel pharmaceutical compositions containing as an active ingredient an N,N'-bis-(dihydroxyphenyl-ethylol)-alkylene diamine or a nontoxic acid addition salt thereof, as well as to methods of using the same.

More particularly, the present invention relates to pharmaceutical compositions containing as an active ingredient a compound of the formula

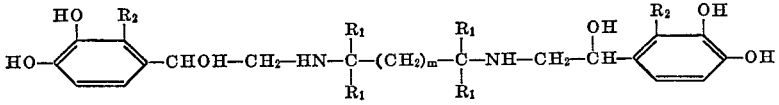

wherein $R_1$ is hydrogen or methyl,
$R_2$ is methyl, methoxy, ethoxy or chlorine and, if $R_1$ is methyl, additionally hydrogen, and
$m$ is an integer from 0 to 10, preferably 2 to 6, inclusive, or a non-toxic, pharmacologically acceptable acid addition salt thereof, in the form of a pure stereoisomer, a mixture of stereoisomers or a racemate.

A compound of the Formula I may be prepared by methods involving well known chemical principles, namely, by reducing a compound of the formula

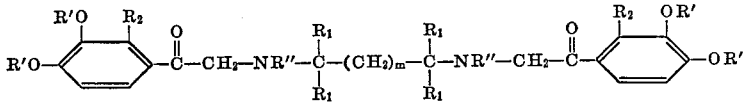

wherein $R_1$, $R_2$ and $m$ have the same meanings as in Formula I; $R'$ is hydrogen or a protective group which is easily removable by hydrolysis or hydrogenation, preferably benzyl, acyl or, together with each other and the adjacent oxygen atoms, an acetal radical, such as diphenyl-methylenedioxy, and $R''$ is hydrogen or benzyl.

The reduction may be effected either by catalytic hydrogenation using the customary platinum, palladium or Raney nickel catalysts, or with the aid of complex hydrides, such as sodium borohydride or lithium aluminum hydride; or also by means of the Meerwein-Ponndorf-Verley Reduction (aluminum alkoxide reduction).

If the protective groups are not already split off during the reduction, they may subsequently be removed by customary methods.

A starting compound of the Formula II may be obtained, for example, by reacting a compound of the formula

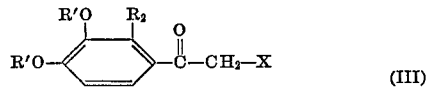 (III)

wherein $R_2$ has the same meanings as in Formula I, $R'$ has the same meanings as in Formula II, and X is chlorine or bromine, with an alkylenediamine of the formula

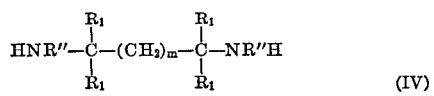 (IV)

wherein $R_1$ and $m$ have the same meanings as in Formula I, and $R''$ has the same meanings as in Formula II, in the presence of a condensation agent, such as potassium carbonate, or of an excess of diamine IV above the stoichiometric amount required for reaction with Compound III.

Racemic mixtures of the compounds of the Formula I may be separated into their individual stereoisomeric components by customary methods.

The bis-substituted alkylenediamines represented by Formula I are organic bases and therefore form acid addition salts with inorganic or organic acids. Examples of non-toxic, pharmacologically acceptable acid addition salts are those formed with hydrochloric acid, hydrobromic acid, sulfuric acid, phosphoric acid, acetic acid, citric acid, tartaric acid, 8-chlorotheophylline or the like. Such acid addition salts are obtained by customary methods, such as by acidifying a solution of the free base with the desired inorganic or organic acid.

The following examples further illustrate the present invention and will enable others skilled in the art to understand it more completely. It should be understood, however, that the invention is not limited solely to the particular examples given below.

EXAMPLE 1

N,N'-bis-[β-(3',4'-dihydroxy-phenyl)-β-hydroxy-ethyl]-1,4-butylenediamine dihydrochloride A mixture consisting of 270 gm. of 2,3,4-trihydroxy-acetophenone [prepared pursuant to Org. Synth. 14, 40 (1934)], 772 ml. of acetone, 131 ml. of pyridine and 338 gm. of diphenyl-dichloro-methane was allowed to stand overnight at room temperature, and then a solution of 200 gm. of sodium hydroxide in 500 ml. of water was added in small portions. The reaction solution was allowed to stand for two hours at room temperature and was then acidified with concentrated hydrochloric acid. The crystalline slurry formed thereby was vacuum-filtered, and the filter cake was washed first with water and then with methanol. 249 gm. of the 2-hydroxy-3,4-diphenylmethylenedioxy-acetophenone (M.P. 155–156° C.) thus obtained were reacted at 40° C. with 288 ml. of dimethyl-sulfate and 204 gm. of potassium hydroxide in methanolic solution. The precipitated reaction product was collected and admixed with ether, the mixture was vacuum-filtered, and the filtrate was evaporated. The 2-methoxy-3,4-diphenylmethylenedioxy-acetophenone obtained thereby was brominated at 80° C. in benzene solution. The solution was evaporated, and the raw α-bromo-2-methoxy-3,4-diphenylmethylenedioxy-acetophenone thus obtained was recrystallized from isopropanol (M.P. 137° C.).

42.5 gm. of this bromoketone were admixed with 26.8 gm. of N,N'-dibenzyl-1,4-butylenediamine and 400 ml. of acetone, and the mixture was refluxed. Thereafter, the reaction mixture was vacuum-filtered, the filtrate was acidified with ethereal hydrochloric acid, and water was added to the acidic solution until it began to become cloudy. N,N'-dibenzyl-N,N'-bis-[β-(3',4'-diphenylmethylenedioxy-2'-methoxy-phenyl)-β-oxo-ethyl]-1,4-butylenediamine dihydrochloride precipitated out; after recrystallization from acetonitrile it had a melting point of 196–198° C. 15 gm. of this compound were boiled for 90 minutes with a mixture consisting of 88.5 ml. of methanol and 61.5 ml. of concentrated hydrochloric acid, and the reaction solution was allowed to cool, whereupon N,N'-dibenzyl-N,N'-bis-[β-(3',4'-dihydroxy-2'-methoxy-phenyl)-β-oxo-ethyl]-1,4-butylenediamine dihydrochloride (M.P. 228–230° C., from water/ethanol) precipitated out. The precipitate was collected and then hydrogenated in a mixture of methanol and water (3:1) at 60° C. and 5 atmospheres pressure in the presence of palladized charcoal as a catalyst, yielding N,N'-bis-[β-(2'-methoxy-3',4'-dihydroxy-phenyl)-β-oxo-ethyl]-1,4-butylenediamine dihydrochloride [M.P. 235–236° C. (decomp.), from water/acetonitrile].

This diketone was then hydrogenated in methanol at room temperature and atmospheric pressure in the presence of platinum as a catalyst, whereby N,N'-bis-[β-(2'-methoxy-3',4'-dihydroxy-phenyl)-β-hydroxy-ethyl]-1,4-butylenediamine dihydrochloride of the formula

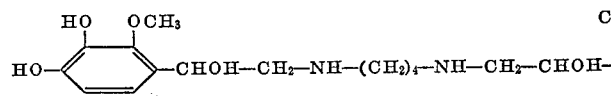

were obtained. After recrystallization from methanol/acetonitrile, the product had a melting point of 173–174° C.

EXAMPLE 2

N,N'-bis-[β-(2'-ethoxy-3'4'-dihydroxy-phenyl)-β-hydroxy-ethyl]-1,4-butylenediamine dihydrochloride dihydrochloride Analogous to Example 1, α-bromo-2-ethoxy-3,4-diphenylmethylenedioxy-acetophenone (M.P. 63–65° C.) was prepared from 2-ethoxy-3,4-diphenylmethylenedioxy-acetophenone (M.P. 84–87° C.). 47.5 gm. of the bromoketone, together with 14.5 gm. of N,N'-dibenzyl-1,4-butylenediamine and 15 gm. of sodium carbonate were refluxed in ethanol for three hours. Thereafter, the reaction mixture was vacuum-filtered, and the filtrate was evaporated. The residue was dissolved in 300 ml. of methanol, the solution was acidified with ethereal hydrochloric acid, and the acidic solution was hydrogenated at 60° C. and 5 atmospheres pressure in the presence of palladized charcoal as a catalyst, yielding N,N'-bis-[β-(2'-ethoxy-3',4'-diphenylmethylenedioxy-phenyl)-β-oxo-ethyl]-1,4-butylenediamine dihydrochloride which had a melting point of 208–210° C. after recrystallization from acetonitrile.

By boiling 23 gm. of this product for 1½ hours in admixture with 140 ml. of methanol and 90 ml. of concentrated hydrochloric acid and thereafter distilling off the methanol, N,N'-bis-[β-(2'-ethoxy-3',4'-dihydroxy-phenyl)-β-oxo-ethyl]1,4-butylenediamine dihydrochloride (M.P. 227–230° C., from water/acetonitrile) was obtained. This compound was hydrogenated at room temperature and atmospheric pressure in methanol in the presence of platinum as a catalyst. After completion of the hydrogenation, the catalyst was filtered off, the filtrate was evaporated, and the residue was recrystallized from ethanol, yielding N,N'-bis-[β-(2'-ethoxy-3',4'-dihydroxy-phenyl)-β-hydroxy-ethyl]-1,4-butylenediamine dihydrochloride, M.P. 180–182° C., of the formula

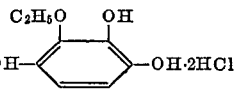

EXAMPLE 3

N,N'-bis-[β-(2'-methyl-3',4'-dihydroxy-phenyl)-β-hydroxyethyl]-1,4-butylenediamine dihydrochloride A mixture consisting of 44 gm. of α-bromo-3,4-dibenzyloxy-2-methyl-acetophenone [M.P. 128–129° C., obtained by brominating 3,4-dibenzyloxy-2-methyl-acetophenone (M.P. 90° C.) with bromine in benzene at 40° C.], 13.4 gm. of N,N'-dibenzyl-1,4-butylenediamine, 200 ml. of ethanol, 75 ml. of acetonitrile and 15 gm. of sodium carbonate was refluxed for three hours. Thereafter, the reaction mixture was vacuum-filtered, the filtrate was evaporated, the residue was dissolved in 300 ml. of methanol, the solution was acidified with ethereal hydrochloric acid, and the acidic solution was hydrogenated at 60° C. and 5 atmospheres pressure in the presence of palladized charcoal as a catalyst. After completion of the hydrogenation, the catalyst was vacuum-filtered off, the filtrate was evaporated, and the residue, N,N'-bis-[β-(2'-methyl-3(4'-dihydroxy-phenyl)-β-oxo-ethyl]-1,4-butylenediamine dihydrochloride, M.P. 268–271° C. (decomp.), was recrystallized from water. This product was hydrogenated in methanol at room temperature and atmospheric pressure in the presence of platinum as a catalyst, yielding N,N'-bis-[β-(2'-methyl-3',4'-dihydroxyphenyl)-β-hydroxy-ethyl]-1,4-butylenediamine dihydrochloride of the formula

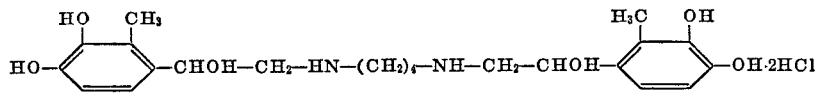

which had a melting point of 188–189° C. after recrystallization from water/acetone.

EXAMPLE 4

N,N'-bis-[β-(2'-methoxy-3',4'-dihydroxy-phenyl)-β-hydroxyethl]-1,6-hexylenediamine dihydrochloride A mixture consisting of 42.5 gm. of α-bromo-2-methoxy - 3,4 - diphenylmethylenedioxy - acetophenone (for preparation see Example 1), 14.8 gm. of N,N'-dibenzyl-1,6-hexylenediamine, 15 gm. of sodium carbonate, 200 ml. of ethanol and 75 ml. of acetonitrile was refluxed for three hours. Thereafter, the reaction mixture was vacuum-filtered, the filtrate was evaporated, the residue was dissolved in 300 ml. of methanol, the solution was acidified with ethereal hydrochloric acid, and the acidic solution was hydrogenated at 60° C. and 2 atmospheres pressure in the presence of palladized charcoal. After completion of the hydrogenation the catalyst was vacuum-filtered off, the filtrate was evaporated, and the residual N,N'-bis-[β-(2' - methoxy - 3',4' - diphenyl - methylenedioxy - phenyl)-β-oxo-ethyl]-1,6-hexylenediamine, M.P. 218–222° C. (decomp.) was crystallized from acetonitrile.

A mixture of 19 gm. of this crystalline product, 78 ml. of concentrated hydrochloric acid and 112 ml. of methanol was refluxed for 90 minutes and yielded N,N'-bis - [β - (2' - methoxy - 3',4' - dihydroxy - phenyl) - β-oxo-ethyl]-1,6-hexylenediamine dihydrochloride (M.P. 258–259° C., from water), which was hydrogenated in methanol at room temperature and atmospheric pressure in the presence of platinum as a catalyst. After completion of the hydrogenation the catalyst was vacuum-filtered off, and the methanol was evaporated, whereby N,N'-bis-[β - (2' - methoxy - 3',4' - dihydroxy - phenyl) - β - hydroxy-ethyl]1,6-hexylenediamine dihydrochloride of the formula

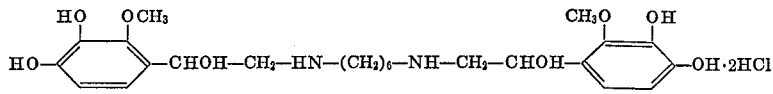

was obtained which had a melting point of 176–178° C. after recrystallization from water/isopropanol.

EXAMPLE 5

N,N'-bis-[β-(2'-methoxy-3',4'-dihydroxy-phenyl)-β-hydroxy-ethyl]-1,8-diamino-octane dihydrochloride Using a procedure analogous to that described in Example 4, N,N'-bis-[β-(2'-methoxy-3',4'-dihydroxy-phenyl)-β-hydroxy-ethyl]-1,8-diamino-octane dihydrochloride, M.P. 121–124° C. (from ethanol/ether), of the formula

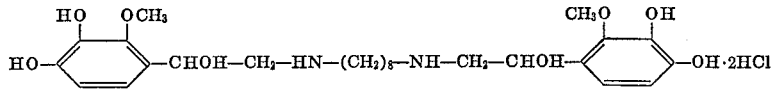

was prepared by reacting α-bromo-2-methoxy-3,4-diphenyl-methylenedioxy-acetophenone with N,N'-dibenzyl-1,8-diamino-octane, subsequently hydrogenating the N,N'-bis - [β-(2' - methoxy - 3',4' - diphenylmethylenedioxy-phenyl)-β-oxo-ethyl]-1,8-diamino-octane dihydrochloride (M.P. 194–198° C.) formed thereby, heating the hydrogenation product with methanolic hydrochloric acid to form N,N'-bis-[β-(2'-methoxy-3',4'-dihydroxy-phenyl)-β-oxo-ethyl] - 1,8 - diamino-octane dihydrochloride (M.P. 228–230° C.), and hydrogenating the latter.

EXAMPLE 6

N,N'-bis-[β-(2'-methyl - 3' - 4' - dihydroxy-phenyl)-β-hydroxy-ethyl] - 2,5 - dimethyl - 2,5 - diamino-hexane dihydrochloride A mixture consisting of 100 gm. of α-bromo-3,4-dimethoxy-2-methyl-acetophenone (M.P. 87–89° C., prepared by brominating 3,4-dimethoxy-2-methyl-acetophenone in ether), 26.5 gm. of 2,5-dimethyl-2,5-diaminohexane, 300 ml. of ethanol and 55 gm. of sodium carbonate was refluxed for three hours. Thereafter, the reaction mixture was vacuum filtered, the filtrate was evaporated, the residue was dissolved in 300 ml. of ether, and the solution was extracted twice with water, dried with sodium sulfate and evaporated. The oily residue was dissolved in 150 ml. of acetonitrile, the resulting solution was acidified with ethereal hydrochloric acid, and the N,N'-bis-[β-(3',4'-dimethoxy - 2 - methyl-phenyl)-β-oxoethyl] - 2,5 - dimethyl - 2,5 - diamino-hexane dihydrochloride precipitated thereby was collected and recrystallized from water, whereupon it had a melting point of 213–217° C. This product was boiled with 48% hydrobromic acid, yielding N,N' - bis - [β-(3',4'-dihydroxy-2'-methyl-phenyl)-β-oxo-ethyl] - 2,5-dimethyl-2,5-diaminohexane dihydrobromide, which was converted into the free base by treatment with aqueous ammonia and subsequently into the dihydrochloride (M.P. 220–230° C.) with ethereal hydrochloric acid. Catalytic hydrogenation of this dihydrochloride in methanol at room temperature and atmospheric pressure in the presence of platinum as a catalyst yielded N,N'-bis-[β-(2'-methyl-3',4'-dihydroxy-phenyl) - β - hydroxy-ethyl]-2,5-dimethyl-2,5-diaminohexane dihydrochloride, M.P. 176–178° C., of the formula

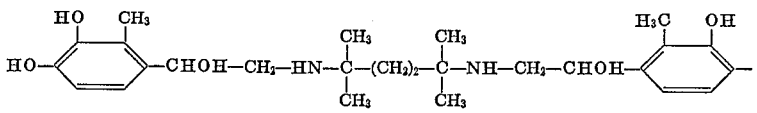

EXAMPLE 7

N,N'-bis-[β-(3',4'-dihydroxy-phenyl)-β-hydroxy-ethyl]-2,5-dimethyl-2,5-diamino-hexane dihydrochloride A mixture consisting of 41.1 gm. of α-bromo-3,4-dibenzyloxy-acetophenone [M.P. 90–92° C., prepared by brominating 3,4-dibenzyloxy-acetophenone (M.P. 96–97° C.), in benzene at 50° C.], 7.2 gm. of 2,5-dimethyl-2,5-diamino-hexane, 15 gm. of sodium carbonate, 200 ml. of ethanol and 20 ml. of acetonitrile was refluxed for four hours. Thereafter, the reaction mixture was vacuum-filtered, the filtrate was evaporated, the residue was dissolved in 100 ml. of ether, and the resulting solution was extracted twice with 100 ml. of water, dried with sodium sulfate and evaporated. The residue was dissolved in 50 ml. of acetonitrile, the resulting solution was acidified with ethereal hydrochloric acid, and the N,N'-bis-[β-(3',-3'-dibenzyloxy-phenyl)-β-oxo-ethyl]-2,5 - dimethyl - 2,5-diamino-hexane dihydrochloride precipitated thereby was collected and recrystallized from ethylacetate/ether, whereupon it had a melting point of 221–226° C. The dihydrochloride was converted into the free base with dilute ammonia, the base was dissolved in 300 ml. of ethanol, and the solution was reduced with sodium borohydride, whereby N,N'-bis-[β-(3',4'-dibenzyloxy-phenyl)-β-hydroxy-ethyl]-2,5-dimethyl-2,5-diamino-hexane gradually precipitated out. The free base was dissolved in acetonitrile, the solution was acidified with ethereal hydrochloric acid, and the dihydrochloride (M.P. 202–205° C.) was precipitated by addition of water to the acidic solution. The dihydrochloride was collected and catalytically hydrogenated in methanol in the presence of palladized charcoal at room temperature and atmospheric pressure, yielding N,N'-bis[β-(3',4'-dihydroxy-phenyl)-β- hydroxyethyl]2,5 - dimethyl-2,5-diaminohexane dihydrochloride of the formula

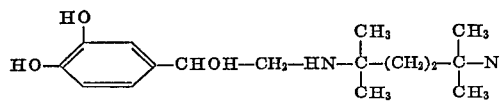 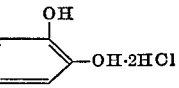

which had a melting point of 228° C. after recrystallization from water/acetonitrile.

EXAMPLE 8

N,N'-bis-[β-(2-chloro-3',4'-dihydroxy-phenyl)-β-hydroxyethyl]-1,6-diamino-hexane dihydrochloride A mixture consisting of 21.5 gm. of α-bromo-2-chloro-3,4-dibenzyloxy-acetophenone (M.P. 98° C.), 7.4 gm. of N,N'-dibenzyl-1,6-diamino-hexane, 7.5 gm. of sodium carbonate, 100 ml. of ethanol and 30 ml. of acetonitrile was refluxed for three hours. Thereafter, the reaction mixture was vacuum-filtered, the filtrate was evaporated, the residue was dissolved in ethyl acetate, the solution was acidified with ethereal hydrochloric acid, and the precipitated N,N' - bis-[β-(2'-chloro-3',4'-dibenzyloxy-phenyl)-β-oxoethyl]-1,6-diamino-hexane dihydrochloride (M.P. 75–80° C.) was collected and transformed into the free base with dilute ammonia. The free base was dissolved in a mixture of ethanol and dioxane, and the solution was reduced with sodium borohydride to yield N,N'-bis-[β-(2'-chloro-3',4'-benzyloxy-phenyl) - β - hydroxy-ethyl]-1,6-diamino-hexane, which was converted into its dihydrochloride (M.P. 98–103° C.) in acetonitrile-ethylacetate solution by means of ethereal hydrochloric acid. The dihydrochloride was catalytically hydrogenated under standard conditions in the presence of Raney nickel as a catalyst, yielding N,N' - bis-[β-(2'-chloro-3',4'-dihydroxy-phenyl)-β-hydroxy-ethyl]-1,6-diamino-hexane dihydrochloride of the formula

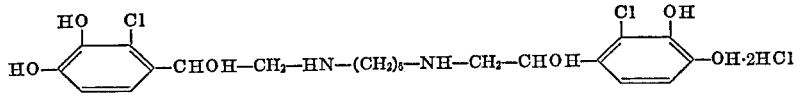

which had a melting point of 190–193° C. after recrystallization from water/acetone.

The compounds embraced by Formula I above and their non-toxic, pharmacologically acceptable acid addition salts, have useful pharmacodynamic properties. More particularly, they exhibit long-lasting broncho-spasmolytic activities in warm-blooded animals without, at the same time, producing the undesirable side-effects—especially undesirable effects upon the heart—usually produced by known broncho-spasmolytics of related structure, such as N,N'-bis-[β-(3',4' - dihydroxy-phenyl)-β-hydroxy-ethyl]-alkylenediamines. In addition, the compounds according to the present invention produce a spasmolytic action upon the uterus and also exhibit antipruritic, vasodilating and antiallergic activities in warm-blooded animals, such as mice, rats, dogs, cats or guinea pigs.

For pharmaceutical purposes the compounds of the Formula I or their non-toxic, acid addition salts are administered to warm-blooded animals perorally, parenterally or topically as active ingredients in customary pharmaceutical compositions, that is, compositions consisting essentially of an inert pharmaceutical carrier and an effective amount of the active ingredient, such as tablets, coated pills, capsules, aerosols, ointments, tinctures or solutions.

One effective dosage unit of the compounds of the Formula I or their non-toxic acid addition salts for oral administration is from 0.083 to 0.84 mgm./kg.

Their effective concentration for topical administration is from 0.1 to 5%, based on the total weight of the topical composition.

The effective unit dosage for parenteral administration is 0.083 to 1.67 γ/kg.

Finally, the effective concentration for inhalation aerosol compositions is 0.1 to 5%, based on the total weight of the aerosol.

The following examples illustrate a few pharmaceutical compositions according to the present invention comprising a compound of the Formula I or a non-toxic acid addition salt thereof as an active ingredient, and represent the best mode contemplated of putting the invention into practical use. The parts are parts by weight unless otherwise specified.

EXAMPLE 9

Tablets

The tablet composition was compounded from the following ingredients:

| | Parts |
|---|---|
| N,N'-bis-[β-(2'-methoxy-3',4'-dihydroxy - phenyl)-β-hydroxy-ethyl]-1,4-diamino - butane dihydrochloride | 20.0 |
| Stearic acid | 6.0 |
| Dextrose | 574.0 |
| Total | 600.0 |

Compounding procedure: The ingredients were intimately admixed with each other, and the mixture was compressed into 600 mgm.-tablets. Each tablet contained 20 mgm. of the diamino-butane compound, and, when administered perorally to a warm-blooded animal of about 60 kg. body weight in need of such treatment, produced very good broncho-spasmolytic effects.

EXAMPLE 10

Ointment

The ointment was compounded from the following ingredients:

| | Parts |
|---|---|
| N,N'-bis-[β-(2'-m-ethoxy-3',4'-dihydroxy-phenyl)-β-hydroxy-ethyl]-1,6-diamino-hexane dihydrochloride | 0.200 |
| Fuming hydrochloric acid | 0.011 |
| Sodium pyrosulfate | 0.050 |
| Mixture of equal parts by volume of cetyl alcohol and stearyl alcohol | 18.000 |
| White vaseline | 5.000 |
| Synthetic bergamot oil | 0.075 |
| Distilled water q.s.ad 100.000 parts. | |

Compounding procedure: The individual ingredients were admixed and processed in customary fashion into an ointment. Topically applied, the ointment was an effective antipruritic.

EXAMPLE 11

Inhalation aerosol

The aerosol composition was compounded from the following ingredients:

| | Parts |
|---|---|
| N-N'-bis-[β-(2'-methyl-3',4'-dihydroxy - phenyl)-β-hydroxy-ethyl]-2,5-dimethyl-2,5 - diaminohexane dihydrochloride | 0.20 |
| Soybean lecithin | 0.05 |
| Propellent gas mixture (trichlorofluoromethane, dichlorodifluoromethane and cryofluorane) q.s.ad 100.00 parts. | |

Compounding procedure: The ingredients were admixed and filled under pressure or deep refrigeration into an aerosol container provided with a metering valve, which released an amount of aerosol spray containing about 1.0 mgm. of the diaminohexane compound each time it was actuated. One metered dose of this spray, inhaled into the respiratory tract of an adult warm-blooded animal, in need of such treatment, produced very good broncho-spasmolytic effects.

Analogous results were obtained when an equal amount of any other compound of Formula I or a non-toxic acid addition salt thereof was substituted for the particular diaminobutane or diaminohexane compound in illustrative Examples 9 to 11. Likewise, the amount of active ingredient in these examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that our invention is not limited to these particular embodiments, and that various changes and modifications may be made without departing from the spirit of the invention or the scope of the appended claims.

We claim:

1. A pharmaceutical composition consisting essentially of an inert pharmaceutical carrier and an effective broncho-spasmolytic amount of a racemic or optically active compound of the formula

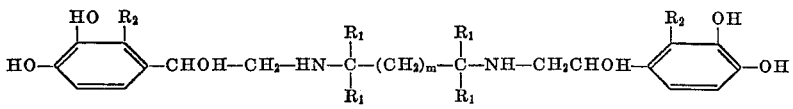

wherein $R_1$ is hydrogen or methyl, $R_2$ is methyl, methoxy, ethoxy or chlorine and, if $R_1$ is methyl, also hydrogen, and $m$ is an integer from 2 to 6, inclusive, or a non-toxic, pharmacologically acceptable acid addition salt thereof.

2. A composition according to claim 1, wherein said compound is N,N'-bis-[β-(2'-methoxy-3',4' - dihydroxyphenyl)-β-hydroxy-ethyl]-1,4-diamino-butane or a non-toxic, pharmacologically acceptable acid addition salt thereof.

3. A composition according to claim 1, wherein said compound is N,N'-bis-[β-(2'-ethoxy - 3',4' - dihydroxyphenyl)-β-hydroxy-ethyl]-1,4-diamino-butane or a non-toxic, pharmacologically acceptable acid addition salt thereof.

4. A composition according to claim 1, wherein said compound is N,N'-bis-[β-(2'methyl - 3',4' - dihydroxyphenyl)-β-hydroxy-ethyl]-1,4-diamino-butane or a non-toxic, pharmacologically acceptable acid addition salt thereof.

5. A composition according to claim 1, wherein said compound is N,N'-bis-[β-(2'-methoxy-3',4' - dihydroxyphenyl)-β-hydroxy-ethyl]-1,6-diamino-hexane or a non-toxic, pharmacologically acceptable acid addition salt thereof.

6. A composition according to claim 1, wherein said compound is N,N'-bis-[β-(2'methoxy-3',4'-dihydroxyphenyl)-β-hydroxy-ethyl]-1,8-diamino-octane or a non-toxic, pharmacologically acceptable acid addition salt thereof.

7. A composition according to claim 1, wherein said compound is N,N'-bis-[β-(2'-methyl - 3',4' - dihydroxyphenyl)-β-hydroxy-ethyl]-2,5-dimethyl - 2,5 - diamino-hexane or a non-toxic, pharmacologically acceptable acid addition salt thereof.

8. A composition according to claim 1, wherein said compound is N,N'-bis-[β-(3',4'-dihydroxy-phenyl)-β-hydroxy-ethyl]-2,5-dimethyl-2,5-diamino-hexane or a non-toxic, pharmacologically acceptable acid addition salt thereof.

9. A composition according to claim 1, wherein said compound is N,N'-bis-[β-(2'-chloro - 3',4' - dihydroxyphenyl)-β-hydroxy-ethyl]-1,6-diamino-hexane or a non-toxic, pharmacologically acceptable acid addition salt thereof.

10. The method of alleviating bronchial spasms in a warm-blooded animal, which comprises administering to said animal an effective broncho-spasmolytic amount of a racemic or optically active compound of the formula

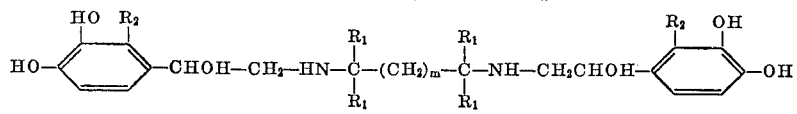

wherein $R_1$ is hydrogen or methyl, $R_2$ is methyl, methoxy, ethoxy or chlorine and, if $R_1$ is methyl, also hydrogen, and $m$ is an integer from 2 to 6, inclusive, or a non-toxic pharmacologically acceptable acid addition salt thereof.

References Cited

UNITED STATES PATENTS 3,329,709   7/1967   Schmid et al.   424—330

ALBERT T. MEYERS, Primary Examiner

N. A. DREZIN, Assistant Examiner

U.S. Cl. XR.

424—45